Patented Nov. 17, 1936

2,060,851

UNITED STATES PATENT OFFICE 2,060,851

CHEMICAL COMPOUNDS

William Stansfield Calcott, Woodstown, N. J., and Richard Gesse Clarkson, Wilmington, Del., assignors to E. I. du Pont de Nemours & Company, Wilmington, Del., a corporation of Delaware No Drawing. Application September 13, 1935, Serial No. 40,414

13 Claims. (Cl. 260—127)

This invention relates to new chemical compounds, their methods of preparation, and their technical uses. More particularly it relates to chemical compounds which are valuable detergent agents, exerting strong cleansing properties even in the presence of mineral acids or large amounts of salts of heavy and alkaline earth metals.

This case constitutes a continuation in part of our copending application, Serial Number 641,322, filed November 4, 1932, which became Patent No. 2,016,956 on October 8, 1935.

This invention has an object to produce new chemical compounds. A further object is to provide novel and easily conducted processes whereby these compounds may be produced from relatively inexpensive starting materials. A still further object is to provide chemical compounds which are not precipitated by mineral acids, concentrated alkalis, or metallic salts and which possess cleansing and detergent properties in a high degree. Other objects will appear hereinafter.

These objects are accomplished by producing chemical compounds having the formula:

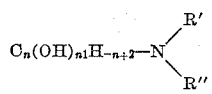

and acid addition products thereof, wherein $n$ is 5 or 6, R' is a higher aliphatic radical, having eight or more carbon atoms, and R'' is a hydroxylated lower aliphatic radical. These products may be obtained in a variety of ways, but most readily by combining an aliphatic halohydrin having less than five carbon atoms with an amine having the formula:

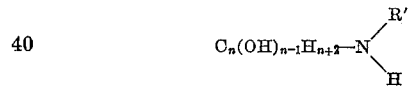

where R' has the foregoing significance. The resultant product may, if desired, be treated with an acid to produce a salt of the amine. Compounds of the class described have been found to possess excellent detergent power in aqueous solution.

As illustrations of the practice of our invention, we give the following examples of a few of the products falling within the scope of the invention and how they may be prepared. These examples merely illustrate but do not limit the scope of our invention. All parts are by weight.

Example 1

A mixture of 18 parts of ethylene chlorhydrin, 12.5 parts potassium hydroxide, 70 parts N-dodecyl-glucyl-amine, and 500 parts methanol was allowed to stand at room temperature for 12 hours and then refluxed for three hours to complete the reaction. The methanol solution was filtered to remove inorganic salts and the filtrate evaporated to dryness. The product, N-dodecyl N-hydroxyl-ethyl glucyl amine, was a colorless waxy solid. It was soluble in acid and alkaline solutions, showing excellent detergent properties in either.

The practice of the invention is not limited to the use of mono-hydroxy-alkyl halides, but may also be applied to dihydroxy-alkyl-halides, as the following example will show.

Example 2

A mixture of 20 parts of glycerol-mono-chlorhydrin, 10 parts potassium hydroxide, 72 parts N-octadecyl-glucyl-amine and 500 parts methanol was treated by the procedure of Example 1. The product, octadecyl-glucyl-amino,propanediol, was a colorless waxy solid, readily soluble in hot water and not precipitated by hydrochloric acid, alkalis, or calcium chloride. The solution in water foamed strongly and exerted remarkable cleansing properties.

Example 3

A mixture of 18 parts of propylene-chlorhydrin, 10 parts potassium hydroxide, 67 parts N-hexadecyl-glucyl-amine and 500 parts methanol was reacted according to the procedure of Example 1. The product, N-hexadecyl N-hydroxypropyl glucyl amine, was a cream colored pasty solid. It was soluble in hot water, and when neutralized with hydrochloric acid gave a detergent solution which was unaffected by calcium chloride, acids or strong bases.

As an alternative to the foregoing, it is also possible to prepare compounds of the class described by the reaction of an open chain aliphatic halide of at least eight carbon atoms with an amine having the formula:

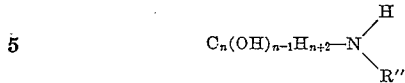

where R'' is an aliphatic radical having less than five carbon atoms and at least one hydroxyl group.

*Example 4*

A mixture consisting of 22.5 parts N-hydroxy-ethyl-glucyl-amine (obtained according to the process set forth in Example F of U. S. Patent 1,994,467), 26 parts cetyl chloride (obtained from cetyl alcohol, zinc chloride and hydrochloric acid), 12 parts sodium carbonate, 30 parts of a mixture containing equal proportions of alcohol and benzene, and a trace of potassium iodide was charged into a copper-lined autoclave which was then maintained at a temperature of about 150° C. for five hours. The reaction mixture was then treated with a large volume of ethyl alcohol, and the inorganic salts which precipitated were removed by filtration. The product comprising essentially N-hydroxy-ethyl-N-cetyl-glucyl-amine, was recovered as a cream colored waxy solid by evaporating the alcoholic filtrate to dryness. The product dissolved readily in hot water and was not precipitated by the addition of mineral acids, alkali hydroxides or alkaline earth salts. It exerted a powerful cleansing action in both acid and alkaline solutions.

In place of using glucyl amines for preparing the products of the present invention as is done in the examples given above, use may be made of any other sugar amine in which the mono-saccharide radical contains 5 or 6 carbon atoms. These sugar amines may be prepared in any suitable manner from mono-saccharides of the ketose or aldose type containing 5 or 6 carbon atoms. Thus, instead of a glucyl amine, that is, an amine prepared from glucose, amines prepared from xylose, galactose, fructose, arabinose, mannose, lyxose, rhamnose, ribose, talose, and the like may be used. A method of preparing such amines is described in a co-pending application of Flint and Salzberg, Serial Number 635,045, filed September 27, 1932, which became Patent No. 2,016,962 on October 8, 1935. Because of their relatively low cost, glucyl amines are preferred to other sugar amines for preparing the products of the present invention.

Acid addition products of the new amines described herein may be made by combining these amines with any suitable acid such as hydrochloric, sulfuric, phosphoric, acetic, and formic.

While dodecyl glucyl amine, hexadecyl glucyl amine, and octadecyl glucyl amine have been employed in carrying out the general process illustrated by Examples 1 to 3, it lies within the scope of this invention to use other sugar amines in this connection such as octyl glucyl amine, decyl glucyl amine, tetradecyl glucyl amine, eicosyl glucyl amine, docosyl glucyl amine, ceryl glucyl amine, etc. Secondary alkyl sugar amines in which the alkyl group contains a straight chain having from ten to twenty carbon atoms are preferred for use in carrying out the general process illustrated by Examples 1 to 3.

Other aliphatic halohydrins beside ethylene chlorhydrin, glycerol mono-chlorhydrin, and propylene chlorydrin may be employed in carrying out the general process illustrated by the first three examples given above. Other aliphatic halohydrins which may be used for this purpose are ethylene bromohydrin, ethylene iodohydrin, trimethylene chlorhydrin, isobutylene glycol alpha chlorhydrin, glycerol mono-bromohydrin, glycerol mono-iodohydrin, etc.

Other compounds which can easily be made according to the process set forth in Example 1 for making N-dodecyl N-hydroxy-ethyl glucyl amine include:

N-octyl N-hydroxy-ethyl glucyl amine,
N-decyl N-hydroxy-ethyl glucyl amine,
N-tetradecyl N-hydroxy-ethyl glucyl amine,
N-cetyl N-hydroxy-ethyl glucyl amine,
N-octadecyl N-hydroxy-ethyl glucyl amine,
N-eicosyl N-hydroxy-ethyl glucyl amine,
N-ceryl N-hydroxy-ethyl glucyl amine, etc.

Other compounds which can easily be made according to the process set forth in Example 2 for making N-octadecyl N-glucyl amino-propane-diol include:

N-octyl N-glucyl amino-propane-diol,
N-decyl N-glucyl amino-propane-diol,
N-dodecyl N-glucyl amino-propane-diol,
N-tetradecyl N-glucyl amino-propane-diol,
N-cetyl N-glucyl amino-propane-diol,
N-eicosyl N-glucyl amino-propane-diol,
N-ceryl N-glucyl amino-propane-diol, etc.

Other compounds which can easily be prepared according to the process set forth in Example 3 for making N-hexadecyl N-hydroxypropyl glucyl amine include:

N-octyl N-hydroxypropyl glucyl amine,
N-decyl N-hydroxypropyl glucyl amine,
N-dodecyl N-hydroxypropyl glucyl amine,
N-tetradecyl N-hydroxypropyl glucyl amine,
N-octadecyl N-hydroxypropyl glucyl amine,
N-eicosyl N-hydroxypropyl glucyl amine,
N-ceryl N-hydroxypropyl glucyl amine, etc.

In place of using N-hydroxy-ethyl glucyl amine for performing the general process described in Example 4, use may be made of N-hydroxypropyl glucyl amine, N-dihydroxypropyl glucyl amine, diglucyl amine, etc.

In place of using cetyl chloride in carrying out the process set forth in Example 4, use may be made of other open chain aliphatic halides containing at least eight carbon atoms. The aliphatic halides preferred for this purpose are the straight chain alkyl halides containing from ten to twenty carbon atoms such as decyl bromide, dodecyl bromide, tetradecyl chloride, cetyl iodide, octadecyl chloride, eicosyl bromide, etc.

Other compounds which may easily be prepared according to the general process described in Example 4 include:

N-octyl N-hydroxy-ethyl glucyl amine,
N-decyl N-hydroxy-ethyl glucyl amine,
N-dodecyl N-hydroxy-ethyl glucyl amine,
N-tetradecyl N-hydroxy-ethyl glucyl amine,
N-octadecyl N-hydroxy-ethyl glucyl amine,
N-octadecenyl N-hydroxy-ethyl glucyl amine,
N-eicosyl N-hydroxy-ethyl glucyl amine, etc.

By way of recapitulation, it may be seen that the

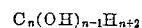

radical which occurs in the new compounds prepared according to the processes described herein is one which is derived from a pentose or a hexose, preferably glucose. R' represents an aliphatic radical having an open chain of at least eight carbon atoms and preferably stands for a straight chain alkyl group containing from ten to twenty carbon atoms, such as the decyl, dodecyl, tetradecyl, cetyl, octadecyl, and eicosyl groups. R" stands for a hydroxylated lower aliphatic radical such as the hydroxy-ethyl, hydroxypropyl, dihydroxypropyl, and glucyl radicals. In the preferred embodiments of the invention, R" stands for a hydroxylated aliphatic radical which contains two or three carbon atoms.

The new compositions covered in this case belong to the class of surface active or capillary active materials in that they have colloidal properties and may therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

The new class of compounds described may be used in cleansing materials of all kinds and, as previously indicated, are particularly valuable for use in acidic aqueous solutions or aqueous solutions containing metallic salts in which ordinary soaps are ineffective. Because of their great effective cleansing power in acidic solutions, the new products are particularly valuable in cleaning silk, wool and other materials which are detrimentally affected by alkaline solutions, but which may be cleaned in acidic solutions.

The treatment baths prepared in accordance with the invention may contain, in addition to the products herein described, other compounds which are surface active or possess cleaning, wetting, penetrating or dispersing properties. As examples of additional materials possessing washing, cleansing, emulsifying and wetting power may be mentioned Turkey red oils, ordinary soaps (in neutral solutions), aromatic sulfonic acids (such as alkylated naphthalene sulfonic acids), mineral oil sulfonic acids, sulfonated derivatives of abietic acid, higher alkyl sulfuric esters, saponin, and aliphatic and aromatic acid amides, such as sodium taurocholate or sodium salts of analogous acid amides. The products of the invention may also be employed in combination with neutral or acid salts, such as, for example, sodium sulfate, sodium chloride, sodium bisulfate, sodium bicarbonate, and similar compounds of the other alkali metals or of ammonium. In a like manner, they may be employed with magnesium sulfate, magnesium chloride, magnesium acetate, zinc chloride and zinc acetate.

Other additional materials with which the products of the invention may be combined are bleaching and disinfectant agents, such as persulfates, percarbonates and perborates; filling materials such as talc, marble-dust and starch; adsorbing materials such as suitable clays, e. g., fuller's earth; protective colloids or dispersing agents such as gum tragacanth, gall acids and their derivatives, agar-agar, glue, methyl cellulose, sulfite cellulose lyes, calcium saccharate, albumin, sodium cellulose glycollate, gelatin, natural and artificial resins, derivatives of chloesterine, phosphatides, gelloses, natural and artificial waxes, wool waxes, solvent and softening agents, organic bases and their salts such as alkylolamine salts and quarternary ammonium compounds, inorganic colloids; and scouring materials such as kieselguhr, powdered pumice, sulfur, flour, china clay, salt and the like. Desirable results for many purposes may also be obtained by employing the tertiary amines or salts thereof, produced as herein described, in combination with the various acyclic, mono-cyclic, or complex cyclic terpenes or derivatives thereof such as, for example, limonene, dipentene, terpinolene, terpinene, phellandrene, sylvestrene, pinene, borynlene, sabinene and their alcoholic, ketonic, and aldehydic derivatives.

It will be apparent, furthermore, that our new products may be combined with a wide variety of other additional materials which possess washing, cleansing, emulsifying, wetting, dispersing, adsorbing, lathering, bleaching, germicidal and bactericidal powers. They may likewise have incorporated therewith artificial or natural perfuming substances, many of which in themselves possess detergent properties of some value.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, weighting salts such as magnesium sulfate or calcium chloride, oils and oils processed by oxidization, polymerization, sulfonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors.

As many apparently widely different embodiments of this invention may be made without widely departing from the spirit and scope thereof, it is to be understood that the invention is not limited to the specific embodiments thereof except as defined in the appended claims.

We claim:

1. Compounds of the group consisting of compounds having the following formula:

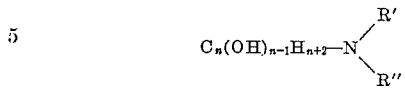

and the acid addition products thereof, in which $n$ is 5 or 6, R' is an aliphatic radical having an open chain of at least eight carbon atoms, and R'' is a hydroxylated lower aliphatic radical.

2. Compounds of the group consisting of compounds having the following formula:

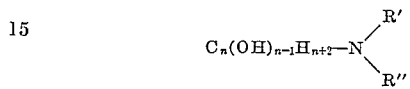

and the acid addition products thereof, in which $n$ is 5 or 6, R' is an alkyl radical having at least eight carbon atoms, and R'' is a hydroxylated lower aliphatic radical.

3. Compounds of the group consisting of compounds having the following formula:

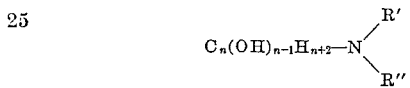

and the acid addition products thereof, in which $n$ is 5 or 6, R' is an alkyl radical having ten to twenty carbon atoms, and R'' is a hydroxylated lower aliphatic radical having not more than four carbon atoms.

4. A compound having the following general formula:

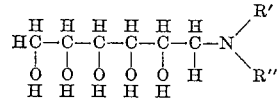

wherein R' is a straight chain alkyl radical having ten to twenty carbon atoms and R'' is a hydroxylated lower aliphatic radical having not more than four carbon atoms.

5. In a process of producing a compound having the general formula set forth in claim 4, the step which comprises reacting an amine having the formula:

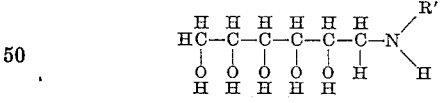

wherein R' is a straight chain alkyl radical having ten to twenty carbon atoms with an aliphatic halohydrin which contains no more than four carbon atoms.

6. A tertiary aliphatic glucamine in which one of the aliphatic groups attached to the nitrogen atom is a higher aliphatic hydrocarbon radical containing ten to twenty carbon atoms, and the other is a hydroxylated lower aliphatic radical having not more than four carbon atoms.

7. N-dodecyl N-hydroxy-ethyl glucyl amine.
8. N-octadecyl N-glucyl amino-propane-diol.
9. N-cetyl N-hydroxy-ethyl glucyl amine.
10. In a process of producing chemical compounds having the following formula:

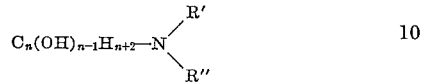

in which $n$ is 5 or 6, R' is an aliphatic radical having an open chain of at least eight carbon atoms, and R'' is a hydroxylated lower aliphatic radical, the step which comprises reacting an amine having the formula:

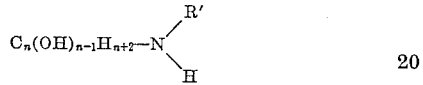

wherein $n$ and R' have the significance set forth above with an aliphatic halohydrin.

11. A process according to claim 10 wherein R' represents an alkyl radical having ten to twenty carbon atoms and the aliphatic halohydrin contains no more than four carbon atoms.

12. In a process of producing a compound having the following general formula:

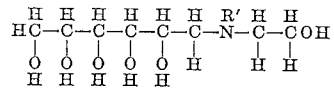

wherein R' is a straight chain alkyl radical having ten to twenty carbon atoms, the step which comprises reacting an amine having the formula:

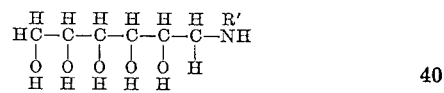

with ethylene chlorhydrin.

13. In a process of producing a compound having the following general formula:

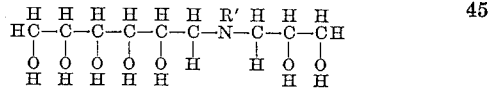

wherein R' is a straight chain alkyl radical having ten to twenty carbon atoms, the step which comprises reacting an amine having the formula:

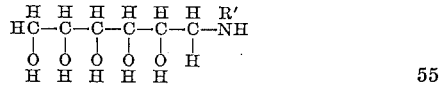

with glycerol monochlorhydrin.

WILLIAM S. CALCOTT.
RICHARD G. CLARKSON.

Certificate of Correction

Patent No. 2,060,851.                                                       November 17, 1936.

WILLIAM STANSFIELD CALCOTT ET AL.

It is hereby certified that errors appear in the printed specification of the above numbered patent requiring correction as follows: Page 1, first column, lines 25 to 29 inclusive, strike out the formula and insert instead the following:

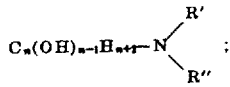

and second column, line 48, after the word "foregoing" insert *method:* and that the said Letters Patent should be read with these corrections therein that the same may conform to the record of the case in the Patent Office.

Signed and sealed this 23rd day of February, A. D. 1937.

[SEAL]                                                  HENRY VAN ARSDALE,
*Acting Commissioner of Patents.*